US007938320B2

(12) United States Patent
Gindele

(10) Patent No.: US 7,938,320 B2

(45) **Date of Patent: *May 10, 2011**

(54) SYSTEMS AND METHODS FOR ENCRYPTED BAR CODE GENERATION

(75) Inventor: Gabe B. Gindele, Wilmington, DE (US)

(73) Assignee: Barclays Bank Delaware, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/649,685

(22) Filed: Dec. 30, 2009

(65) Prior Publication Data

US 2010/0103471 A1 Apr. 29, 2010

Related U.S. Application Data

(63) Continuation of application No. 12/024,552, filed on Feb. 1, 2008, now Pat. No. 7,658,324.

(51) Int. Cl.

| | |
|---|---|
| ***G06K 5/00*** | (2006.01) |
| ***G06K 19/00*** | (2006.01) |
| ***G07F 19/00*** | (2006.01) |
| ***G06F 7/08*** | (2006.01) |

(52) U.S. Cl. ......... 235/380; 235/379; 235/381; 235/487

(58) Field of Classification Search .................. 235/375, 235/380, 381, 462.01, 487, 494

See application file for complete search history.

(56) References Cited

U.S. PATENT DOCUMENTS

| | | | | |
|---|---|---|---|---|
| 3,601,805 | A * | 8/1971 | Snook | 235/380 |
| 5,450,491 | A * | 9/1995 | McNair | 713/184 |
| 5,619,027 | A * | 4/1997 | Ackley | 235/462.01 |
| 6,202,933 | B1 * | 3/2001 | Poore et al. | 235/493 |
| 7,347,361 | B2 * | 3/2008 | Lovett | 235/380 |
| 7,658,324 | B2 * | 2/2010 | Gindele | 235/380 |
| 2001/0034717 | A1 * | 10/2001 | Whitworth | 705/64 |
| 2004/0155104 | A1 | 8/2004 | Mitchell, Jr. | |
| 2005/0121512 | A1 * | 6/2005 | Wankmueller | 235/380 |
| 2005/0247798 | A1 * | 11/2005 | Graves et al. | 235/493 |
| 2006/0278698 | A1 * | 12/2006 | Lovett | 235/380 |
| 2007/0018002 | A1 * | 1/2007 | Lapstun et al. | 235/487 |
| 2007/0051797 | A1 * | 3/2007 | Randolph-Wall et al. | 235/381 |
| 2007/0187489 | A1 | 8/2007 | Martinez | |
| 2008/0048044 | A1 * | 2/2008 | Zhao et al. | 235/494 |
| 2008/0210754 | A1 | 9/2008 | Lovett | |
| 2009/0140044 | A1 * | 6/2009 | Johanns et al. | 235/380 |

FOREIGN PATENT DOCUMENTS

DE 10107823 A1 9/2002

OTHER PUBLICATIONS

PCT Search Report and Written Opinion, dated Jun. 29, 2009, for PCT/US2009/032552 filed Jan. 30, 2009.

* cited by examiner

*Primary Examiner* — Thien M. Le
*Assistant Examiner* — April A Taylor
(74) *Attorney, Agent, or Firm* — Woodcock Washburn LLP

(57) ABSTRACT

Disclosed herein are systems and methods that provide a temporary payment instrument having a barcode with an encrypted account number and expiration date assigned to a consumer. For example, such systems and methods screen a consumer to determine whether he or she meets credit eligibility requirements established by a merchant card provider. If the candidate meets the credit eligibility, such systems and methods may assign a payment card account number and expiration date to the consumer, encrypt the payment card account number and expiration date, and generate a barcode that includes the payment card and account number embedded therein.

25 Claims, 5 Drawing Sheets

200

205 210

| Potential Account/ Expiration Numbers | Character ASCII | Conversion Nibble | |
|---|---|---|---|
| | | In Hex | In Binary |
| 0 | 30 | 0 | 0000 |
| 1 | 31 | 1 | 0001 |
| 2 | 32 | 2 | 0010 |
| 3 | 33 | 3 | 0011 |
| 4 | 34 | 4 | 0100 |
| 5 | 35 | 5 | 0101 |
| 6 | 36 | 6 | 0110 |
| 7 | 37 | 7 | 0111 |
| 8 | 38 | 8 | 1000 |
| 9 | 39 | 9 | 1001 |
| space | 20 | b | 1011 |
| / | 2f | c | 1100 |
| padding | 0 | f | 1111 |

FIG. 2

SYSTEMS AND METHODS FOR ENCRYPTED BAR CODE GENERATION

CROSS-REFERENCE TO RELATED APPLICATIONS

This application is a continuation of U.S. patent application Ser. No. 12/024,552, filed Feb. 1, 2008, the disclosure of which is incorporated herein by reference.

BACKGROUND

Typically, when shopping at a merchant such as a retail store, a consumer may apply for a merchant sponsored payment card that may be used to purchase goods and/or services from the merchant. For example, when checking out, the consumer may be asked by a merchant representative such as a cashier whether he or she wishes to apply for a payment card sponsored by the merchant. If the consumer elects to apply for the payment card, the consumer may provide personal information such as his or her legal name, social security number, home address, or the like. The merchant representative may enter the information into a computing device such as a cash register. Such information may be transmitted to the payment card provider associated with the retail merchant. The payment card provider may use the personal information to screen the consumer to determine whether he or she has suitable credit.

Upon verification that the customer has suitable credit, the payment card provider may assign a payment card account number and an expiration date of the payment card to the customer. The payment card provider then typically generates two barcodes that include the expiration date and account number assigned to the customer. The barcodes are then received by the computing device operated by the merchant representative. Upon receipt, the computing device prints the barcodes on a receipt such that the consumer may use the receipt with the printed barcodes as a temporary payment card until his or her regular payment card may be generated by the payment card provider.

Typically, the barcodes generated by the payment card provider are encrypted or encoded before transmission to the computing device at the merchant. For example, each character of an account number and expiration date may be substituted with an 8-bit binary representation to create a binary sequence. The binary sequence may then be encrypted or encoded. The encrypted or encoded sequence may then be used to generate a barcode with the account number and expiration date embedded therein. Unfortunately, because of the size of the encrypted or encoded sequence, two barcodes are generated for the account number and expiration date.

SUMMARY

Disclosed herein are systems and methods that provide a temporary payment instrument having a barcode with an encrypted account number and expiration date assigned to a consumer. According to such a method, a consumer may apply for a payment card such as a credit card that may be used to purchase goods and/or services from a merchant. For example, the consumer may provide personal information such as his or her legal name, social security number, address, phone number, or the like to a cashier. The cashier may enter such information into a cash register that may be in communication with a merchant card provider.

The merchant card provider may receive the personal information. Upon receipt, the merchant card provider may screen the consumer to determine whether he or she has suitable credit to receive a payment card associated with the merchant. If the consumer has suitable credit, the merchant card provider may assign an account number and an expiration date to the consumer. For example, the merchant card provider may assign the account number and expiration date for the payment card being issued to the consumer.

The merchant card provider may convert the account number and expiration date into a payload that may be encrypted. For example, the merchant card provider may substitute the characters representative of the assigned account number and expiration date with a 4-bit binary number to create the payload. The payload representation of the account number and expiration date may then be encrypted. Upon encryption, the payload may be encoded such that a barcode may be created that includes the encrypted payload representation of the account number and expiration date assigned to the user. In one embodiment, the barcode that may included the encrypted payload of the account number and expiration date may be less than three inches wide.

After being created, the barcode may be printed on a target material such as receipt paper, printer paper, or any other suitable material to create a temporary payment instrument for the consumer. For example, after generating the barcode, the merchant card provider may transmit the information associated with the barcode to the cash register. The cash register may then print the barcode on receipt paper to create a temporary payment instrument. The temporary payment instrument may be used by the consumer to purchase goods and/or services from the merchant until a permanent payment card such as a credit card, debit card, or the like may be issued to the consumer.

BRIEF DESCRIPTION OF THE DRAWINGS

FIG. 2 illustrates an example table used to generate a barcode for a temporary payment card.

DETAILED DESCRIPTION OF ILLUSTRATIVE EMBODIMENTS

Figure 1:
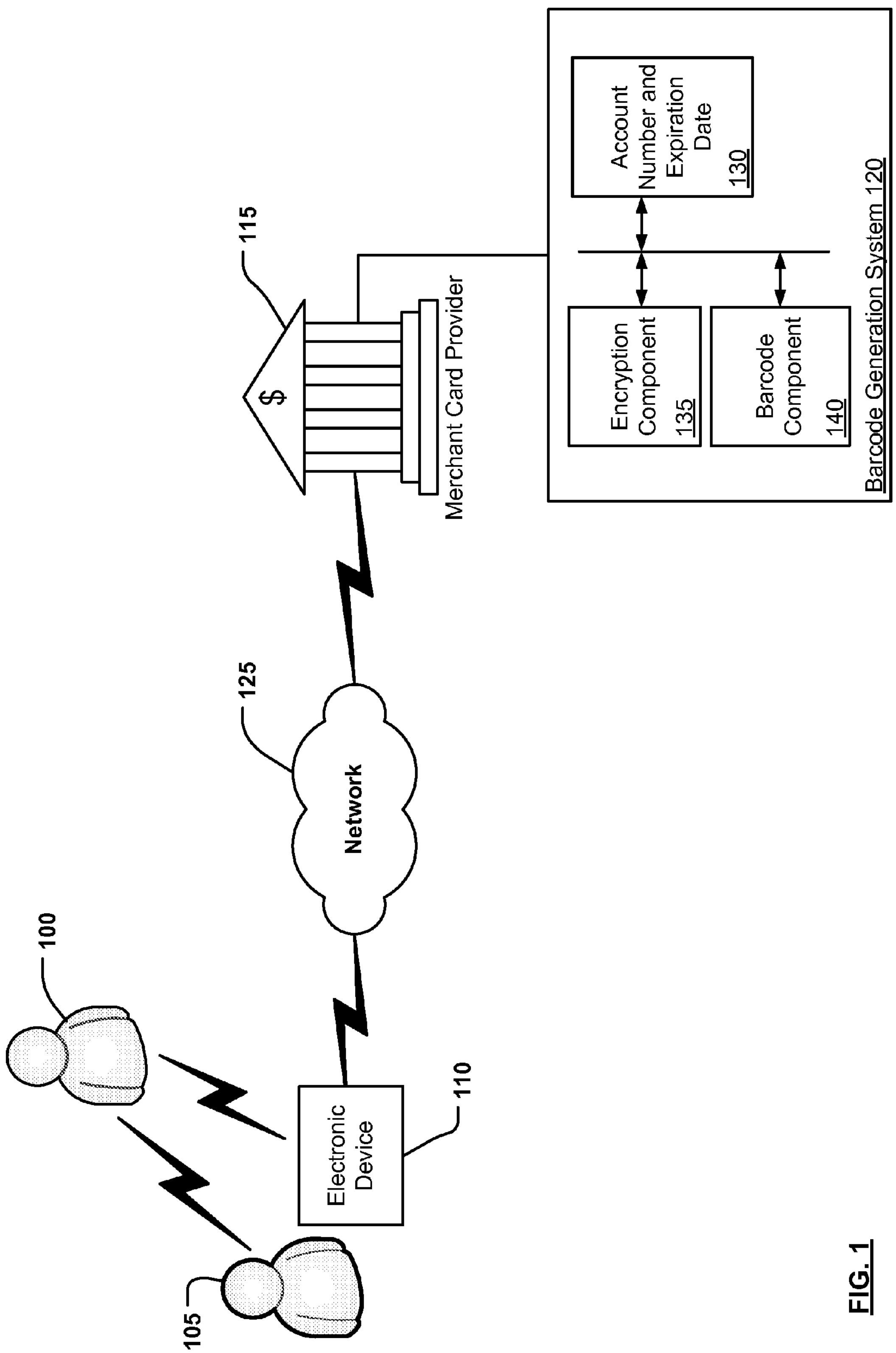
FIG. 1 is a functional block diagram of an example embodiment of a merchant card provider in communication with a consumer and/or a merchant representative

FIG. 1 is a functional block diagram of an example embodiment of a merchant card provider 115 in communication with a merchant representative 105 via an electronic device 110. The merchant card provider 115 may be a system operated by a merchant such as a retail store, gas station, or the like that may issue a credit card to a customer such that the customer may use the credit card to buy goods and/or services from the merchant. Alternatively, the merchant card provider 115 may be a third party employed by a merchant to issue a credit card to a customer. According to one embodiment, the merchant card provider 115 may include a barcode generation system 120 implemented therein, which will be described in more detail below.

The merchant representative 105 may be a cashier, a customer service representative, or the like at a place of business of the merchant. The merchant representative 105 may be in communication with a consumer 100. The consumer 100 may be a customer of the merchant such that the consumer 100 may purchase goods and/or services from the merchant. The merchant representative 105 may scan the goods and/or services using the electronic device 110 to calculate the total price owed by the consumer 100.

The electronic device 110 may include hardware components such as a processor, a graphics card, a storage component, a memory component, an antenna, a communication port, or the like. The electronic device 110 may also include software components such as an operating system that may control the hardware components. According to example embodiments, the electronic device 110 may be a computer, an automated retail cashier system, a cash register, or the like.

The merchant representative 105 may ask the consumer 100 whether he or she may wish to apply for a payment card sponsored by the merchant prior to, during, or after scanning the goods and/or services. If the consumer 100 wishes to apply for a payment card, the merchant representative 105 may ask the consumer 100 to provide personal information such as his or her legal name, social security number, home address, phone number, bank account, or the like. The merchant representative 105 may enter the personal information into the electronic device 110.

Additionally, the consumer 100 may directly input the information into the electronic device 110. For example, if the electronic device is a computer, an automated cashier system, or the like, the consumer 100 may interact directly with the electronic device to apply for a payment card such as a credit card. That is, the consumer 100 may directly enter his or her personal information into the electronic device 110 to apply for the payment card associated with the merchant.

The electronic device 110 may be in communication with the merchant card provider 115 via a network 125 such that the personal information entered into the electronic device 110 may be received by the merchant card provider 115. The network 125 may be any suitable communication network such as a telephone network, a wireless network, a local-or wide-area network including a corporate intranet or the Internet, for example.

Upon receipt of such information, the merchant card provider 115 may screen the consumer 100 to determine whether the consumer 100 has suitable credit to receive a payment card. For example, the merchant card provider 115 may use the received information to calculate a credit rating associated with the consumer 100. The merchant card provider 115 may also provide such information to a third party credit service that may calculate a credit rating associated with the consumer 100. If the merchant card provider determines that the consumer 100 has suitable credit, based on the credit rating, the merchant card provider may assign a payment card account number and expiration date to the consumer 100.

The merchant card provider 115 may also include a barcode generation system 120. The barcode generation system 120 may include may include any combination of hardware components such as processors, databases, storage drives, registers, cache, RAM memory chips, data buses, or the like and/or software components such as operating systems, database management applications, or the like. The barcode generation system 120 may include any other suitable hardware and/or software components such that the barcode generation system 120 may generate a barcode with an account number and expiration date assigned to the consumer 100.

According to an example embodiment, the barcode generation system 120 may include an account and expiration date module 130, an encryption component 135, and a barcode component 140. The account and expiration date module 130, the encryption component 135, and the barcode component 140 may be in operative communication with each other via, for example, a bus or any other subsystem that may transfer data between components and modules in the barcode generation system 120.

The account and expiration date module 130 may include any combination of hardware components such as processors, databases, storage drives, registers, cache, RAM memory chips, data buses, or the like and/or software components such that the account and expiration date module 130 may store and parse the payment card account number and expiration date assigned to a consumer such as consumer 100, shown in FIG. 1. According to one embodiment, upon verification of a credit rating associated with a consumer such as consumer 100, the merchant card provider 115 may assign a payment card account number and an expiration date to the consumer, as described above. The account and expiration date module 130 may store the assigned payment card account number and expiration date for each of the consumers.

The encryption component 135 may include any combination of hardware components such as processors, databases, storage drives, registers, cache, RAM memory chips, data buses, or the like and/or software components such that the encryption component 135 may encrypt a payment card account number and expiration date. For example, the encryption component 135 may receive the payment card account number and expiration date assigned to a consumer from the account number and expiration date module 130. The encryption component 135 may then use one or more tables, algorithms, ciphers, or the like to substitute each character of the account number and expiration date with a binary representation that may be encrypted, for example. Additionally, the encryption component 135 may use any suitable encryption technique with the tables, algorithms, ciphers, or the like such as elliptical curve encryption, symmetric encryption, public/private key encryption, or the like.

The barcode component 140 may include any combination of hardware components such as processors, databases, storage drives, registers, cache, RAM memory chips, data buses, or the like and/or software components such that the barcode component 140 may generate a barcode associated with the encrypted account number and expiration date. For example, the barcode component 140 may receive the encrypted account number and expiration date from the encryption component 135. The barcode component 140 may then generate a barcode representative of the account number and expiration date. According to one embodiment, the barcode representative of an account number and expiration date may be less than three inches wide, which will be described in more detail below.

Upon generation of a barcode representative of the account number and expiration date assigned to a consumer such as consumer 100, the barcode component 140 may transmit the generated barcode to the electronic device 110. The electronic device 110 may then print the barcode onto a target material such as receipt paper, computer paper, cardboard, or the like to create a temporary payment instrument that may be used by the consumer 100 to make purchases at the merchant. For example, the consumer 100 may use the temporary payment instrument including the barcode to make purchases from the merchant until a permanent payment card may be provided to the consumer 100 by the merchant card provider 115.

FIG. 2 illustrates an example table 200 for generating a sequence that may be encrypted and encoded into a barcode for a temporary payment card. For example, as described above, the encryption component 135 may include one or more encoding tables such as table 200.

The table 200 may include an account number column 205. The account number/expiration date column 205 may include a representation of each of the possible characters that may be included in an account number and expiration date that may be assigned to a consumer. In an example embodiment, an account number that may be assigned to a consumer may include a 16-digit sequence. Additionally, each digit of the 16-digit sequence may be a digit from 0 to 9. Thus, as shown in FIG. 2, the account number column 205 in the encryption table 200 may include an entry for each digit from 0 to 9.

Additionally, an expiration date may be assigned to the consumer indicative of when the payment card being issued may expire. The expiration date may include a two digit month, a forward slash "/" character, and a four digit year. As described above, the two digit month and four digit year may be represented by the digits 0 to 9 in the account number/expiration date column 205. The account number/expiration date column 205 may also include the "/" in the expiration date as well as the space that may be present between the account number and the expiration date.

In an example embodiment, the account number/expiration date column 205 may also include a pad character. The pad character may be appended to the end of the account number and expiration date if, for example, the account number and expiration date include fewer characters than a standard format for the account numbers and expiration dates.

The table 200 may also include a conversion nibble column 210. The conversion nibble column 210 may include a hexadecimal representation and a corresponding 4-bit binary representation that may be used to create a payload of the account number and expiration date. The payload may include a converted account number and expiration date. For example, each character of the account number and expiration date may be substituted by a corresponding 4-bit binary representation in the conversion nibble column 210, as shown in FIG. 2, to create the payload.

According to one embodiment, the payload created using the table 200 may then be encrypted. For example, the payload may be encrypted using an encryption key such as a 128-bit encryption key, a 256-bit encryption key, or the like and one or more encryption algorithms such as an AES encryption algorithm, an Elliptical Curve Encryption Algorithm, or the like to generate an encrypted payload representative of the account number and expiration date. The encrypted payload may then be encoded with an encoding algorithm, such as a BASE64 encoding algorithm, such that a barcode may be generated using the payload.

Figure 3:
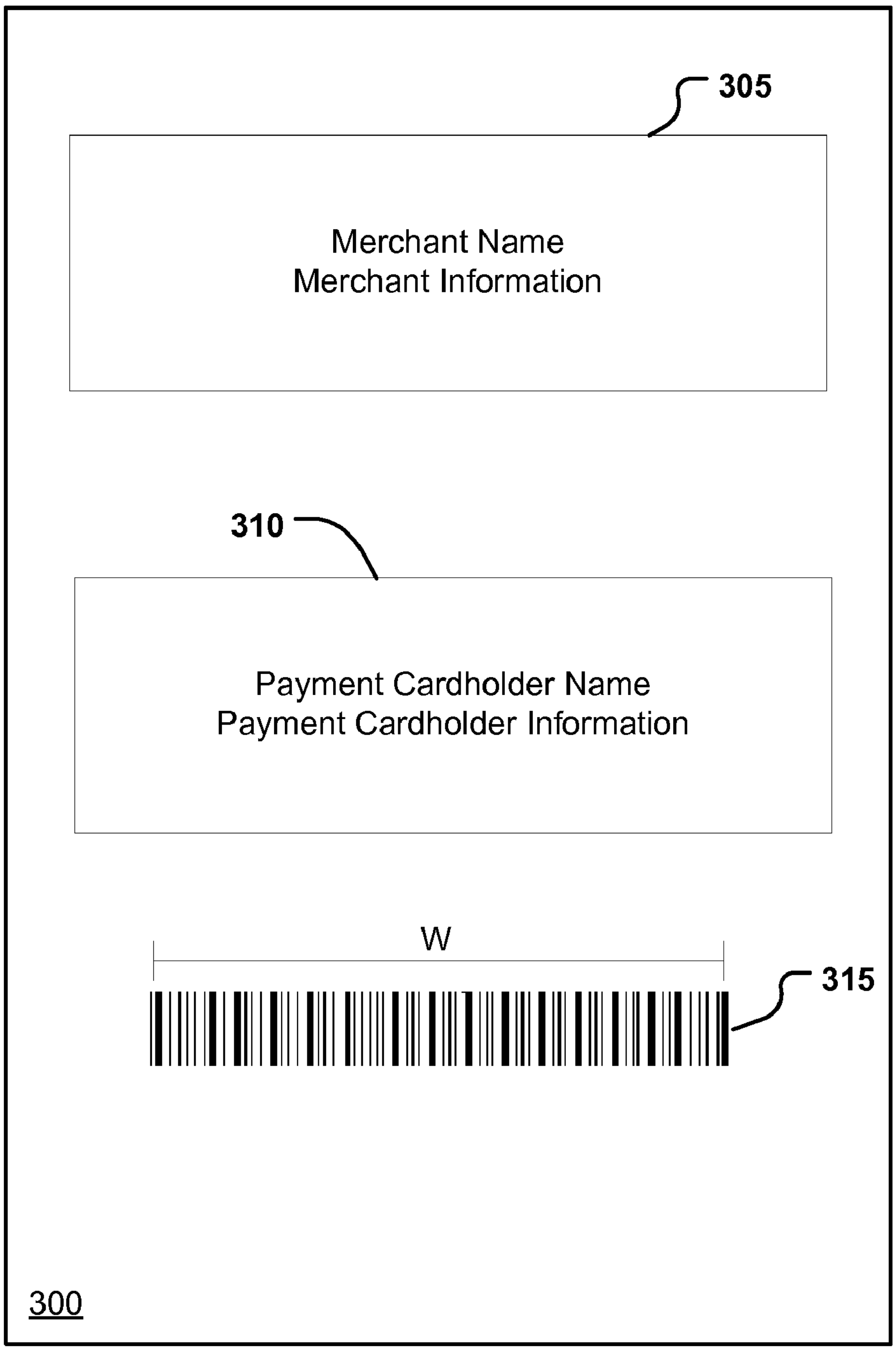
FIG. 3 depicts an example temporary payment instrument including a barcode.

FIG. 3 depicts an example temporary payment instrument 300. According to one embodiment, the payment instrument 300 may be a temporary payment card that may be used by a consumer to purchase goods and/or services from a merchant. For example, as described above, the consumer may wish to apply for a payment card usable at a merchant such as a retail store. The consumer may provide personal information to a merchant card provider that may verify his or her credit worthiness. Upon verification, the temporary payment instrument 300 may be generated by the merchant card provider such that the consumer may use the temporary payment instrument 300 until a payment card such as a credit card may be provided by the merchant card provider.

The temporary payment instrument 300 may include merchant or sponsor information 305. The merchant or sponsor information 305 may include, for example, the name, location, store identifier, or the like of the merchant and/or sponsor of the payment card being applied for by the consumer.

According to an example embodiment, the temporary payment instrument 300 may further include consumer information 310. The consumer information 310 may include information such as a name, address, telephone number, or the like associated with the consumer that applied for the payment card.

The temporary payment card 300 may also include a barcode 315. The barcode 315 may be any suitable barcode such as a CODE128 barcode that may be scanned by, for example, a barcode scanner. The barcode 315 may include a barcode representative of an account number and expiration date assigned to a consumer after being approved for a payment card sponsored by a merchant.

The barcode 315 may correspond to an alphanumeric sequence. The alphanumeric sequence may be the encrypted account number and expiration date assigned to the consumer, as described above. The example barcode 315 shown in FIG. 3 corresponds to the sequence "T/O sEtkcMX j6XVEzVLaflzUKdBDu68K72Fvw3QkdZEEkf9."

The barcode 315 may be a one-dimensional bar code that extends along a first direction and defines a width W along that direction. The width W may be less than three inches such that only the barcode 315 may need to be scanned to purchase goods and/or services charged to the account number and corresponding expiration date associated with the consumer. That is, the account number and expiration date may be encoded into a single one-dimensional bar code having a width of less than three inches.

Figure 4A:
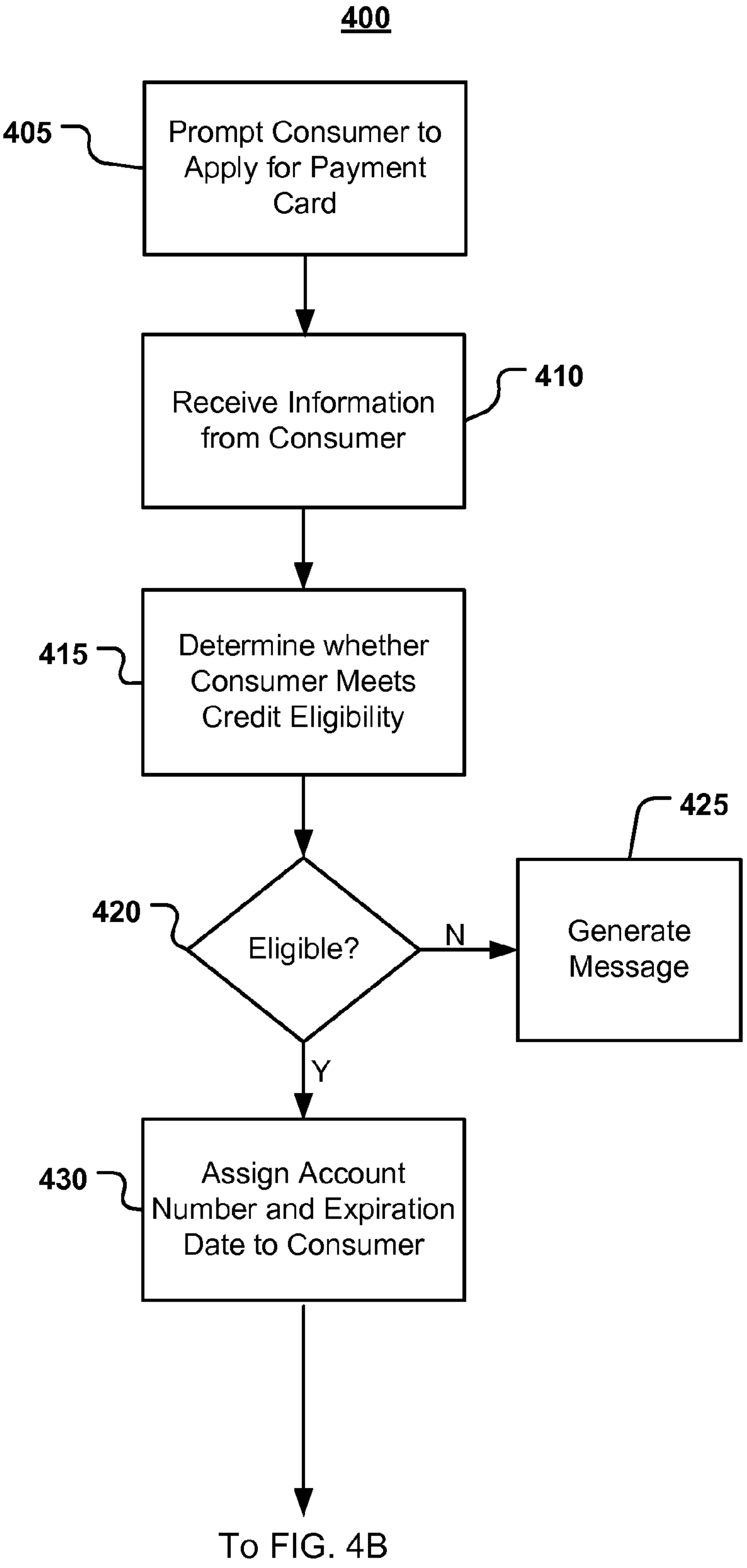
FIGS. 4A and 4B depict a flowchart of an example method for encrypting and generating a barcode for a temporary payment card.
Figure 4B:
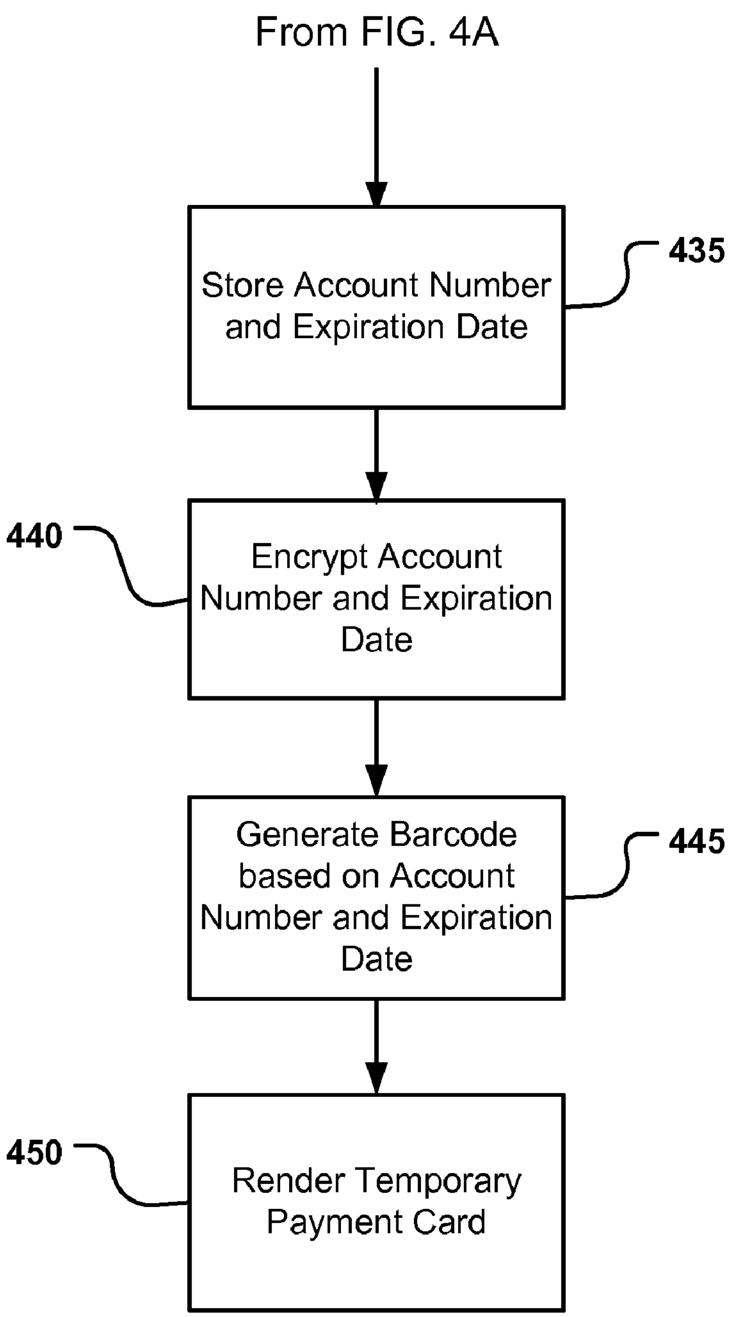

FIGS. 4A and 4B depict a flowchart of an example method for encrypting and generating a barcode for a temporary payment instrument. According to example embodiments, example method 400 may be performed by the systems described above in FIG. 1 such as the barcode generation system 120. At 405, a consumer may be prompted to apply for a payment card such as a credit card, debit card, or the like. For example, a merchant representative such as a cashier may ask the consumer whether he or she may wish to apply for a payment card sponsored by the merchant. If the consumer wishes to apply for a payment card that may be used to purchase goods and/or services from the merchant, for example, the merchant representative may ask the consumer to provide personal information such as his or her legal name, social security number, home address, phone number, bank account, or the like. The merchant representative may enter the personal information into an electronic device such as a cash register, a computer, or the like.

Alternatively, the consumer may directly input his or her personal information into the electronic device. For example, if the electronic device is a computer, an automated cashier system, or the like, the consumer may interact directly with the electronic device to apply for a payment card such as a credit card.

At 410, a merchant card provider may receive the personal information associated with the consumer. As described above, the consumer may provide personal information to a merchant representative that may enter such information into the electronic device. The customer may also enter the personal information directly into the electronic device. The merchant card provider may receive the information from the electronic device via a network. For example, the merchant card provider may be in communication with the electronic device via a network such as a wireless network, a local-or wide-area network including a corporate intranet, or the Internet.

At 415, the merchant card provider may determine whether the consumer meets one or more credit eligibility requirements established by, for example, the merchant that may be sponsoring the payment card. For example, the merchant card provider may use the personal information, received at 410, to calculate a credit rating associated with the consumer. Alternatively, the merchant card provider may provide the personal information, received at 410, to a third party credit service that may calculate a credit rating associated with the consumer.

The merchant card provider may use the calculated credit rating to determine whether to issue a payment card to the consumer. For example, the merchant card provider may compare the calculated credit rating associated with the consumer to a threshold credit rating. The threshold credit rating may be the minimum credit score established by the merchant to issue a payment card to a consumer.

At 420, if the consumer does not meet the necessary credit eligibility, a message, indicating that a payment card account may not currently be issued, may be generated at 425. For example, if the consumer's credit rating may be less than the credit rating threshold, a message may be generated that indicates to the consumer that a credit decision may not be currently reached. The generated message may be transmitted to the electronic device and output to the consumer.

At 420, if the consumer meets the necessary credit eligibility, the merchant card provider may assign a payment card account number and expiration date to the consumer at 430. For example, if the consumer's credit rating meets or exceeds the credit rating threshold, the merchant card provider may assign a new payment card account number to the consumer. The merchant card provider may also assign an expiration date associated with payment card embodying the payment card account number assigned to the consumer.

At 435, the merchant card provider may store the account number and expiration date assigned to the consumer. For example, the merchant card provider may include an account number and expiration date module. The account number and expiration date module may store the account numbers and corresponding expiration dates for each consumer having a payment card account.

At 440, the merchant card provider may encrypt the account number and expiration date assigned to the consumer. According to one embodiment, the merchant card provider may include an encryption component. The encryption component may be in communication with the account number and expiration date module such that the encryption component may receive the assigned account number and expiration date of the consumer and encrypt the account number and expiration date at 440.

For example, the encryption component may include one or more tables. The tables may include a representation of each character that may be in the account number and expiration date assigned to the consumer. The table may also include a nibble such as a binary nibble that may be assigned to each of the possible characters of an account number and expiration date. The encryption component may substitute each character of the account number and expiration date with the corresponding nibble in the table to generate a payload.

The payload may be encrypted using an encryption key such as a 128-bit encryption key, a 256-bit encryption key, or the like and one or more encryption algorithms such as an AES encryption algorithm, an Elliptical Curve Encryption Algorithm to generate an encrypted sequence representative of the account number and expiration date.

At 445, the merchant card provider may generate a barcode based on the account number and expiration date. For example, the payload, generated at 440, may be encoded using an encoding algorithm, such as a BASE64 encoding algorithm. Upon being encoded, the barcode may be generated such that the barcode may include the payload representing the account number and expiration date embedded therein.

At 450, a temporary payment instrument may be rendered to the consumer. For example, the information associated with the barcode may be transmitted to the electronic device. The electronic device may then print the barcode on a target material such as receipt paper, printer paper, cardboard or the like to create the temporary payment instrument. The consumer may then use the temporary payment instrument to purchase goods and/or services from the merchant. For example, when checking out, the consumer may present the temporary payment instrument to a cashier. The cashier may then scan the barcode on the temporary payment instrument using a barcode scanner such that the goods and/or services being purchased may be charged to the account number represented by the barcode. According to one embodiment, the consumer may use the temporary payment instrument until a permanent payment card such as a credit card may be issued to consumer by the merchant card provider.

What is claimed:

1. A temporary payment instrument, the temporary payment instrument comprising:

a target material; and a one-dimensional barcode printed on the target material, wherein the barcode is less than three inches wide, and a 16-character payment card account number and an eight-character expiration date associated with a payment card are encrypted into the bar code by compressing each character of the account number and the expiration date from a respective eight-bit binary sequence into a respective four-bit binary sequence such that the account number and expiration date are recoverable from the bar code.

2. The temporary payment instrument of claim 1, wherein each of the characters is a space, a forward slash, or one of the digits 0-9.

3. A temporary payment instrument, the temporary payment instrument comprising:

a target material; and a one-dimensional barcode printed on the target material, wherein the barcode is less than three inches wide and a string of at least 24 characters is encrypted into the bar code such that the string of characters is recoverable from the bar code, and the string of characters includes a payment card account number and an expiration date associated with a payment card, wherein the string of characters is encrypted into the bar code by compressing each character in the string from a respective eight-bit binary sequence into a respective four-bit binary sequence.

4. The temporary payment instrument of claim 3, wherein the string of characters includes a 16-digit payment card account number and an 8-digit expiration date associated with the payment card.

5. The temporary payment instrument of claim 3, wherein each of the characters is represented by a four-bit binary sequence.

6. The temporary payment instrument of claim 3, wherein each of the characters is a space, a forward slash, or one of the digits 0-9.

7. The temporary payment instrument of claim 3, wherein the target material is a paper.

8. The temporary payment instrument of claim 3, wherein the string of characters is encrypted into the bar code using a symmetric encryption algorithm.

9. The temporary payment instrument of claim 3, wherein the string of characters is encrypted into the bar code using an asymmetric encryption algorithm.

10. The temporary payment instrument of claim 3, wherein the string of characters is encrypted into the bar code using elliptical curve encryption.

11. A method for generating a barcode for a temporary payment instrument, the method comprising:

converting a string of at least 24 characters into a payload by compressing each character of the string from a respective eight-bit binary sequence into a respective four-bit binary sequence;

encrypting the payload;

generating a one-dimensional barcode representing the encrypted payload, wherein the barcode is less than three inches wide and the string of characters is encrypted into the bar code such that the string of characters is recoverable from the bar code; and printing the barcode on a target material.

12. The method of claim 11, wherein the payload is encrypted using a symmetric encryption algorithm.

13. The method of claim 11, wherein the payload is encrypted using an asymmetric encryption algorithm.

14. The method of claim 11, wherein the payload is encrypted using elliptical curve encryption.

15. The method of claim 11, wherein the string of characters includes a payment card account number and an expiration date associated with a payment card.

16. The method of claim 11, wherein the string of characters includes a 16-digit payment card account number and an 8-digit expiration date associated with a payment card.

17. The method of claim 11, wherein each of the characters is a space, a forward slash, or one of the digits 0-9.

18. The method of claim 11, wherein the target material comprises a paper.

19. A temporary payment instrument, the temporary payment instrument comprising:

a target material; and a one-dimensional barcode printed on the target material, wherein the barcode is less than three inches wide and a string of at least 24 characters is encrypted into the bar code such that the string of characters is recoverable from the bar code, and the string of characters includes a payment card account number and an expiration date associated with a payment card, wherein the string of characters includes a 16-digit payment card account number and an 8-digit expiration date associated with the payment card.

20. The temporary payment instrument of claim 19, wherein each of the characters is represented by a four-bit binary sequence.

21. The temporary payment instrument of claim 19, wherein each of the characters is a space, a forward slash, or one of the digits 0-9.

22. The temporary payment instrument of claim 19, wherein the target material is a paper.

23. The temporary payment instrument of claim 19, wherein the string of characters is encrypted into the bar code using a symmetric encryption algorithm.

24. The temporary payment instrument of claim 19, wherein the string of characters is encrypted into the bar code using an asymmetric encryption algorithm.

25. The temporary payment instrument of claim 19, wherein the string of characters is encrypted into the bar code using elliptical curve encryption.

* * * * *